June 11, 1963
H. R. LAWRENCE
3,092,963
VECTOR CONTROL SYSTEM
Filed Dec. 15, 1960
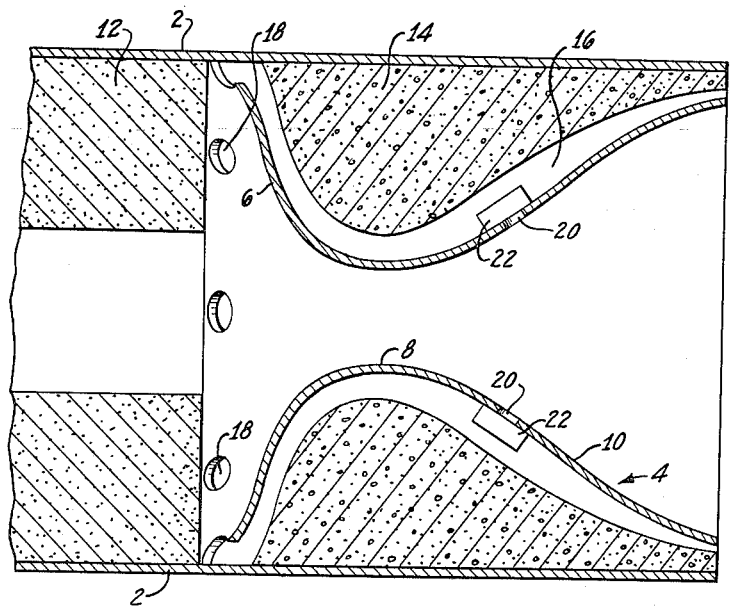
INVENTOR:
HERBERT R. LAWRENCE
BY
*Eckhoff and Slick*
ATTORNEYS 3,092,963
VECTOR CONTROL SYSTEM
Herbert R. Lawrence, Atherton, Calif., assignor to United Aircraft Corporation, a corporation of Delaware
Filed Dec. 15, 1960, Ser. No. 75,956
4 Claims. (Cl. 60—35.54)

This invention relates to a method of thrust-vector control combined with a method of nozzle cooling for solid propellant rocket engines.

In the past, a number of methods of steering rocket vehicles have been proposed, none of which have proved to be fully satisfactory. One method is to use aerodynamic surfaces, but this system suffers from the defect that it is only operative when the rocket is being operated within the atmosphere. Further, such systems are complicated and add a considerable weight to the rocket engine.

It has also been proposed to use a gimballed or hinged connection between portions of the rocket engine and the nozzle. However, this is ordinarily impractical in the case of solid propellant rockets since the engine includes a major portion of the vehicle structure. Although it is possible to provide a system wherein only the nozzle section of the motor is moved, such an approach causes many engineering problems, particularly in the development of gas-tight seals for movable members operating at high temperatures. The vehicle must be made longer and severe aft closure problems are encountered. Further, high actuation forces are required tending to increase the weight and complicate the control system.

Another system proposed is the use of auxiliary rockets. Since the thrust required for control in any direction may approach 10% of the main engine thrust, four such auxiliary rockets are necessary for control in any direction and add considerable weight to the rocket engine.

Means have also been proposed for introducing a mechanical device into the exit gas stream such as a jet vane, tab, spoiler or jetevator, but such systems provide difficulties in that the device, as well as the actuating mechanism, is exposed to the high temperature of the exhaust gases. Further, high actuating forces are required and there is a significant loss of specific impulse.

Various systems have been proposed for the cooling of rocket nozzles. Although the vaporization of a liquid (i.e. the fuel and/or oxidizer) is frequently employed in the cooling of the nozzle and combustion zone of the liquid fueled rockets, this system has not been practical in the case of solid fueled rockets.

In my application Serial No. 55,384 filed September 12, 1960, I provided a system wherein thrust vector control and nozzle cooling are achieved by the provision of an annular tank for liquid surrounding the throat of the rocket nozzle wherein the liquid is vaporized and selectively injected into the nozzle. The vaporization of the liquid serves to cool the nozzle while its selective injection transversely into the nozzle produces a shock wave, providing thrust vector control. Although the system therein outlined is a highly effective one for cooling and thrust vector control, it does have the inherent drawbacks of any liquid system. Substantially all liquids tend to be unstable to some degree on storage so that systems employing a liquid must be subjected to constant surveilance to insure that everything is in working order. Thus when a liquid cooling and thrust vector control system is used in conjunction with a solid propellant rocket, at least some of the long-term storage stability for which the solid rocket is known is lost.

Another disadvantage of the systems heretofore proposed is that no protection is afforded to the surface of the nozzle from the impingement of solid combustion products or direct contact with hot gas.

In accordance with the present invention, a system is provided for a solid propellant rocket wherein nozzle cooling and thrust vector control are achieved employing only solid propellants. Generally speaking, the present invention is carried out by providing an annular chamber surrounding the throat of the rocket engine, said chamber being filled with a relatively low temperature, clean burning propellant whereby at least a part of the cool, clean gas flows along the walls of the nozzle with valve means for selectively injecting at least some of the gas generated by the burning low temperature propellant transversely into the nozzle to produce a shock wave. The temperature of the burning gas from the propellant mixture surrounding the nozzle is substantially lower than the temperature of the gas from the burning propellant which comprises the main rocket propellant and the nozzle is thus kept relatively cool since the nozzle is protected by a boundary layer of cool gas. Since the cool gas contains no solid combustion products, erosion is minimized. At the same time, by the proper actuation of the valve means, thrust vector control can be achieved while the thrust of the rocket is augmented.

Additionally, since fixed nozzles are used the stress and installation problems associated with aft closures which contain multiple openings are avoided. Furthermore, the valving is exposed only to the gas flow of the relatively low temperature, clean propellant so that the problems ordinarily associated with control means which must be actuated within hot gas streams are largely obviated.

The present system increases the efficiency of the rocket engine since the otherwise wasted space surrounding the nozzle is utilized. The nozzle with its thrust vector control system forms a single compact unit which is easy to install, thus lending itself particularly to segmented engines. Since the control system is adapted not only to control the rocket and cool the nozzle, the system also provides additional thrust, so that the addition of the cooling and control system detracts little from the overall efficiency of the rocket.

In the drawing forming part of this application the single FIGURE is a partial sectional view of the nozzle and aft end of a rocket engine embodying the present invention.

In the drawing, the engine has a casing 2 and a nozzle 4. The nozzle comprises the conventional convergent section 6, the throat 8 and the divergent section 10. The main body of the rocket motor is filled with a propellant mixture 12 of high performance characteristics as is well known to those skilled in the art. The off gas from such a propellant has a very high temperature and frequently contains solid combustion products. The annular space surrounding the nozzle 4 is filled with a different propellant mixture 14 said propellant mixture being a clean-burning mixture, producing a gas stream having a relatively low temperature compared with the temperature of the gas developed by the mixture 12 and being free of solids. Preferably the propellant mixture 14 does not completely fill the annular space, but a small passage 16 is provided between the propellant mixture and the nozzle 4 so that gas can freely flow through the passage before the propellant 14 has been substantially reduced in size by burning.

A plurality of holes or slots 18 are provided near the junction of the convergent section of the nozzle with the casing 2. Just aft of the throat in the divergent section 10 a plurality of openings 20 are provided, each of which is equipped with a hot gas valve 22 with control means attached thereto, said control means not being illustrated. At least 3 openings 20 with associated valves 22 must be provided and preferably at least 4 are used. Of course, the openings 20 are evenly spaced in the nozzle regardless of number.

When the main propellant charge 12 is ignited, some of the hot gas will, of course, flow into the openings 18 igniting the charge 14. As the charge 14 ignites, and builds up pressure in the passage 16, the openings 20 may or may not be closed by the action of the valves 22. If some of the valves 22 are open, gas will flow from one or more of the openings 20 exercising thrust vector control. If control is not necessary at the moment, the valves 22 are closed so that gas flowing from the burning propellant 14 will flow only through the openings 18 where it will flow back along the walls of the nozzle providing a boundary layer of relatively cool, clean gas along the surface of the nozzle tending to protect the nozzle from direct contact with the hotter gas from the propellant 12. Of course, as the relatively low temperature gas flows along the inner surface of the nozzle through the space 16, it will also tend to keep the nozzle cool. The valves 22 can be individually controlled at any time in order to achieve thrust vector control by means not forming part of this application. The propellant 14 and openings 20 can be so proportioned that even when there is a substantial flow of gas from one or more of the openings 20 there will still be a substantial flow of gas through the openings 18 providing for protection of the inner throat at all times.

Suitable "hot" and "cool" propellants are well known to those skilled in the art. Non-limiting examples of such propellants are ammonium nitrate and rubber as the cool propellant and aluminized ammonium perchlorate with rubber as the hot propellant.

I claim:

1. In a solid propellant rocket engine having a convergent-divergent discharge nozzle, said engine being provided with a main solid propellant which burns at a relatively high temperature and exhausts through said nozzle, the improvement comprising a second solid propellant in said rocket engine, said second solid propellant burning at a relatively low temperature and having clean gas characteristics by comparison with said first propellant, means communicating the exhaust gas from the second propellant to a first continuously open outlet from said second solid propellant to the convergent section of the nozzle whereby at least part of the gas from said second propellant is directed to flow along substantially the entire length of the inner surface of the nozzle and a second outlet on said nozzle in communication with said second propellant means for controlling the opening in said second outlet whereby at least part of said gas can be injected transversely in said nozzle whereby gas from said second solid propellant provides nozzle cooling and thrust vector control.

2. In a solid propellant rocket engine having a convergent-divergent discharge nozzle, a housing surrounding the nozzle forming an annular space, said engine being provided with a main solid propellant which burns at a relatively high temperature and exhausts through said nozzle, the improvement comprising a second solid propellant in said annular space, said second solid propellant burning at a relatively low temperature and having clean gas characteristics by comparison with said first propellant, means communicating the exhaust gas from the second propellant to a first continuously open outlet from said second solid propellant to the convergent section of the nozzle whereby at least part of the gas from said second propellant is directed to flow along substantially the entire length of the inner surface of the nozzle and a second outlet on said nozzle in communication with said second propellant means for controlling the opening in said second outlet whereby at least part of said gas can be injected transversely in said nozzle whereby gas from said second solid propellant provides nozzle cooling and thrust vector control.

3. The engine of claim 2 wherein at least four transverse openings are provided in the divergent section of the nozzle, each of said openings being controlled by a valve.

4. A solid propellant rocket engine comprising a rocket casing having a main propellant housed therein, a nozzle located aft of said casing, said nozzle having conventional converging and diverging sections, a housing surrounding the nozzle forming an annular space surrounding said nozzle, a second propellant housed in said annular space, said second propellant being clean burning and producing gas at a lower temperature than said main propellant, a plurality of openings in the converging section of said nozzle whereby hot gas flowing from said first propellant will flow through said openings and ignite said second propellant, a plurality of openings in said diverging section, and valve means adjacent said openings whereby at least a portion of the combustion products of said second propellant can be discharged transversely into the exhaust stream, a portion of said gas flowing through the openings in the convergent section for forming a boundary layer in said nozzle.

References Cited in the file of this patent

UNITED STATES PATENTS

| | | |
|---|---|---|
| 2,354,151 | Skoglund | July 18, 1944 |
| 2,770,097 | Walker | Nov. 13, 1956 |
| 2,847,821 | Brown | Aug. 19, 1958 |
| 2,922,050 | Loughran | Jan. 19, 1960 |
| 2,943,821 | Wetherbee | July 5, 1960 |
| 3,019,687 | Gongwer | Feb. 6, 1962 |
| 3,036,430 | Eggers et al. | May 29, 1962 |

FOREIGN PATENTS

| | | |
|---|---|---|
| 1,197,701 | France | June 8, 1959 |